(12) United States Patent
Philippart

(10) Patent No.: US 7,061,148 B2
(45) Date of Patent: Jun. 13, 2006

(54) DEVICE FOR COOLING AN ELECTRICAL MACHINE, IN PARTICULAR A SYNCHRONOUS ELECTRICAL MACHINE HAVING PERMANENT MAGNETS

(75) Inventor: Olivier Philippart, Valenciennes (FR)

(73) Assignee: Jeumont S.A., Courbevoie (FR)

( * ) Notice: Subject to any disclaimer, the term of this patent is extended or adjusted under 35 U.S.C. 154(b) by 0 days.

(21) Appl. No.: 10/890,218

(22) Filed: Jul. 14, 2004

(65) Prior Publication Data

US 2005/0012409 A1 Jan. 20, 2005

(30) Foreign Application Priority Data

Jul. 17, 2003 (FR) .................................. 03 08745

(51) Int. Cl.
*H02K 9/00* (2006.01)
(52) U.S. Cl. ....................... 310/58; 310/59; 310/60 A; 310/64
(58) Field of Classification Search ................. 310/54, 310/58, 59, 62–63, 60 A, 64
See application file for complete search history.

(56) References Cited

U.S. PATENT DOCUMENTS

| | | | | |
|---|---|---|---|---|
| 4,836,123 A | * | 6/1989 | Grinde et al. ................ | 114/382 |
| 5,892,307 A | * | 4/1999 | Pavlovich et al. ........ | 310/68 B |
| 6,424,069 B1 | * | 7/2002 | Pullen et al. ........... | 310/156.38 |
| 6,879,069 B1 | * | 4/2005 | Weidman et al. ............. | 310/61 |
| 2003/0001441 A1 | | 1/2003 | Peterson et al. | |

FOREIGN PATENT DOCUMENTS

| | | |
|---|---|---|
| DE | 199 50 418 A | 4/2001 |
| DE | 101 58 757 A | 6/2003 |
| GB | 796 970 A | 6/1958 |
| GB | 2 261 327 A | 5/1993 |

OTHER PUBLICATIONS

French Search Report FR 0308745, dated Apr. 2, 2004.

* cited by examiner

*Primary Examiner*—Tran Nguyen
(74) *Attorney, Agent, or Firm*—Connolly Bove Lodge & Hutz LLP

(57) ABSTRACT

The cooling device according to the invention comprises, in each of the stator recesses which contain windings, a cooling tube located in the longitudinal direction of the recess and supplied with cooling fluid. The cooling tube is located in the inlet portion of each of the recesses which is closest to the air gap, and thus constitutes a thermal barrier between the windings of the stator and the permanent magnets carried by the rotor. A device for the external cooling of the stator may be combined with the tubes for cooling the internal portion of the stator.

12 Claims, 5 Drawing Sheets

DEVICE FOR COOLING AN ELECTRICAL MACHINE, IN PARTICULAR A SYNCHRONOUS ELECTRICAL MACHINE HAVING PERMANENT MAGNETS

TECHNICAL FIELD

The invention relates to a device for cooling an electrical machine and in particular a synchronous electrical machine having permanent magnets.

BACKGROUND TO THE INVENTION

Electrical machines such as motors or alternators generally comprise a stator having a magnetic circuit in which are provided recesses which are to receive windings and which are distributed in a circumferential direction about the axis of the stator, and a rotor which is mounted rotatably about the axis of the stator and which comprises an active surface to which magnetic elements constituted by permanent magnets are secured, in the case of synchronous electrical machines having permanent magnets.

The recesses of the stator extend in a longitudinal direction and to a specific depth, in the magnetic circuit of the stator, in a direction perpendicular to their longitudinal direction, and they open out on an inlet face of the stator, which face is located facing the active surface of the rotor comprising the magnetic elements, such as permanent magnets. An air gap whose width is generally of the order of a few millimeters is provided between the inlet face of the stator and the active surface of the rotor. The recesses of the stator extend towards the inside of the magnetic circuit of the stator to a specific depth, between an inlet end located closest to the air gap and a base located inside the magnetic circuit of the stator in the direction towards its armature (or frame).

The electrical losses which occur inside some elements of electrical machines give rise to heating which may be detrimental to the functioning and the maintenance of the integrity of the machine. In particular, in the case of synchronous machines having permanent magnets, a very large majority of the electrical losses are produced in the windings and the magnetic circuit of the stator. The permanent magnets of the rotor may then be subjected to heating by heat exchange by convection inside the air gap. Excessive heating of the permanent magnets results in a reduction in their residual induction and in a reduction in the performance of the electrical machine.

In general, it is known to use devices for cooling electrical machines that cool the stator by the circulation of exchange fluid at the external and internal periphery of the stator. The release of heat in the stator is then absorbed by the heat-exchange fluid circulating in thermal contact with the stator at its external periphery and at its internal periphery.

The external periphery of the stator can be cooled by sheathing that delimits a cooling cavity surrounding the stator or, in the case of immersed machines, by the circulation of the immersion fluid in contact with the external surface of the stator frame.

The stator can be cooled at its internal periphery, on the side where the air gap is located, by cooling tubes which are located in the recesses of the stator and which are supplied with cooling fluid by a circuit for supplying and collecting fluid which may be common with the supply circuit of the cavity surrounding the external periphery of the stator, in the case where cooling is effected inside sheathing.

The cooling tubes are located, in each of the recesses, in a base portion of the recess, inside the stator frame, that is to say, in the portion of the recess located remote from the air gap. The location of the cooling tubes in the base portion of the recesses is necessitated for electromagnetic reasons; a tube composed of conductive material and used for the circulation of the cooling fluid is the seat of induced currents whose circulation results in the generation of losses in the stator when the stator is subjected to a variable magnetic field. The location of the cooling tubes at the base of the recesses makes it possible very largely to eliminate this problem of losses, the variation in the magnetic field at the base of the recesses being practically zero. The tube at the bottom of the recess cools the winding and the magnetic circuit without being the seat of substantial losses in addition to the losses of the stator.

However, that arrangement is not the most favorable, in particular in the case of synchronous machines having permanent magnets, inasmuch as the cooling tubes cannot protect the permanent magnets against heating by the windings at the location of the inlet portion of the recesses which is directed towards the air gap. In addition, the loss density of the stator is higher at the location of the winding plane situated on the side where the air gap is located, that is to say, at the recess inlet, so that cooling, when carried out at the recess bases, is not applied in the region of maximum heating.

Those disadvantages exist both in the case of radial flux machines in which the rotor is mounted inside an annular stator in a coaxial arrangement and in the case of discoidal machines in which the stator and the rotor each comprise at least one disc carrying magnetic elements on one or two active faces, the active faces of the stator and rotor discs being placed opposite one another, while providing an air gap, so that axial flux circulation is obtained, that is to say, in accordance with the direction of the axis common to the rotor and stator discs.

In the case of radial flux machines, the longitudinal direction of the recesses is the axial direction while, in the case of discoidal motors, the longitudinal direction of the recesses is radial, that is to say, perpendicular to the axis of rotation of the discoidal electrical machine.

Both in the case of a radial flux machine and in the case of an axial flux machine, it is necessary to provide an efficient device for cooling the stator, in particular when the rotor is a rotor having permanent magnets, the machine then being a synchronous machine.

SUMMARY OF THE INVENTION

The object of the invention is to propose a device for cooling an electrical machine comprising a stator in which successive recesses are provided in a circumferential direction of the stator about a stator axis, which recesses each contain at least one winding and open out on an inlet face of the stator, and a rotor mounted rotatably about the axis of the stator and having an active face which is located facing the inlet face of the stator, while forming a free space or an air gap with the inlet face of the stator, and on which are located magnetic elements constituted preferably by permanent magnets, each of the recesses of the stator extending in a longitudinal direction and from the inlet face of the stator, which face is directed towards the air gap, in a direction perpendicular to the longitudinal direction, in accordance with a specific depth of the recess, the cooling device comprising, in each of the stator recesses, at least one cooling tube extending in the longitudinal direction of the recess and means for setting in circulation a cooling fluid inside each of the cooling tubes of the stator, the cooling tubes being in communication at their ends with manifolds for the supply and evacuation of cooling fluid which are connected to a cooling circuit comprising at least one pump and one heat exchanger, so that the cooling fluid circulates in a closed circuit, this cooling device permitting a substantial improvement in the thermal protection of the magnetic rotor elements constituted preferably by permanent magnets.

To that end, for each of the recesses of the stator, at least one cooling tube is located in the inlet portion of the recess closest to the air gap.

The invention relates in particular to:

a device for cooling an electrical machine of the radial flux type comprising an annular stator which surrounds a rotor and which comprises recesses whose longitudinal direction is parallel with an axis of the electrical machine, which axis is common to the rotor and the stator, characterised in that it comprises both a device for external cooling, having a cavity for the circulation of cooling fluid surrounding the external peripheral portion of the stator and tubes for internal cooling located in accordance with the longitudinal direction of the recesses in their inlet portion, the cavity of the device for external cooling being in communication with manifolds for the supply and evacuation of cooling fluid which are connected to a cooling circuit comprising a pump and a heat exchanger;

a device for cooling an electrical machine immersed in a fluid ensuring the external cooling of the stator of the electrical machine, characterised in that it comprises solely a circuit for the internal cooling of the stator, which circuit comprises, in the inlet portions of each of the stator recesses, a cooling tube in communication at its ends with the manifolds for the supply and evacuation of cooling fluid which are connected to a cooling circuit comprising at least one pump and one heat exchanger;

in the case of a naval electrical propulsion machine secured in a pod suspended by a strut from the hull of a boat, the means for the supply and evacuation of cooling fluid for the circuit for the internal cooling of the stator, comprising in particular a pump and a heat exchanger, are located in the suspension strut of the pod;

in the case of an electrical axial flux machine comprising a stator in the form of an annular disc and a rotor comprising at least one magnetic circuit in the form of a disc, the stator comprising recesses whose longitudinal direction is radial relative to the stator disc and perpendicular to the axis of the electrical machine, the cooling tubes are located in accordance with the longitudinal direction of the recesses, in radial directions of the disc-form magnetic circuit of the stator.

Preferably:

the cooling fluid is a liquid such as water;

the cooling tubes are composed of a material having poor electrical conductivity lower than that of copper and having good thermal conductivity higher than that of epoxy resin;

the tubes are composed of one of the following materials: metal alloys, such as stainless steels and copper-nickel-zinc alloy, polymers of the type LCP, PPS or nylon, polymers containing a filler, composite materials.

BRIEF DESCRIPTION OF DRAWINGS

In order to explain the invention more clearly, a description will be given, by way of example and with reference to the appended Figures, of several embodiments of a device for cooling an electrical machine, according to the invention.

DESCRIPTION OF PREFERRED EMBODIMENTS

Figure 1:
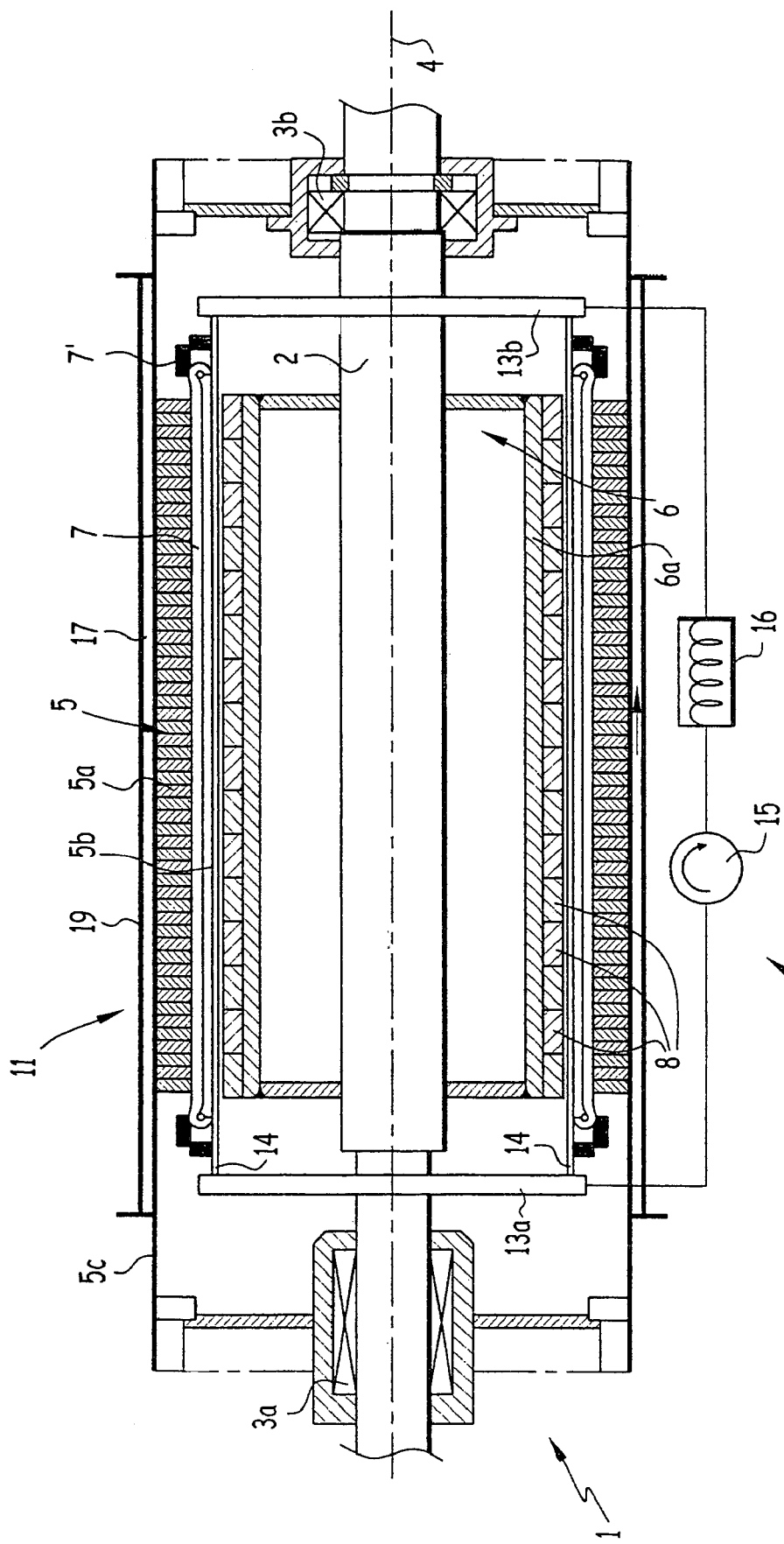
FIG. 1 is a sectional view of an electrical machine equipped with a device according to the invention and according to a first embodiment, the external cooling of the stator being effected in an annular cavity limited by sheathing.

FIG. 1 shows the whole of a radial flux machine and of a device for cooling the stator of the machine.

The radial flux machine, generally indicated by the reference sign 1, comprises a longitudinal shaft 2 mounted rotatably about an axis 4 inside bearings 3a and 3b.

Fastened to the shaft 2 is the rotor 6 of the electrical machine whose annular stator 5 surrounds the rotor over its entire external periphery.

The stator 5 comprises a magnetic circuit 5a which may be constituted, at least partially, by a stack or roll of pieces of magnetic sheet-metal. Recesses extending along the entire length of the stator in the axial direction 4 and to a specific depth in the radial direction are provided inside the magnetic circuit 5a of the stator. The recesses are placed in succession over the circumference of the internal periphery of the stator, about the axis 4 which constitutes both the axis of the rotor and the axis of the stator.

At least one electrical winding 7 which is connected by electrical conductors 7' to means for supplying or recovering current, depending on the function of the electrical machine (motor or generator), is located in each of the recesses. The windings 7 located in the stator recesses may be constituted by turns stacked one on the other in accordance with several roll levels, in the radial direction of the recesses.

The rotor 6 comprises a tubular steel rim having a cylindrical external surface 6a on which are secured magnetic elements, such as permanent magnets 8, placed along the entire length of the rotor and constituting successive rows in the circumferential direction.

Figure 3:
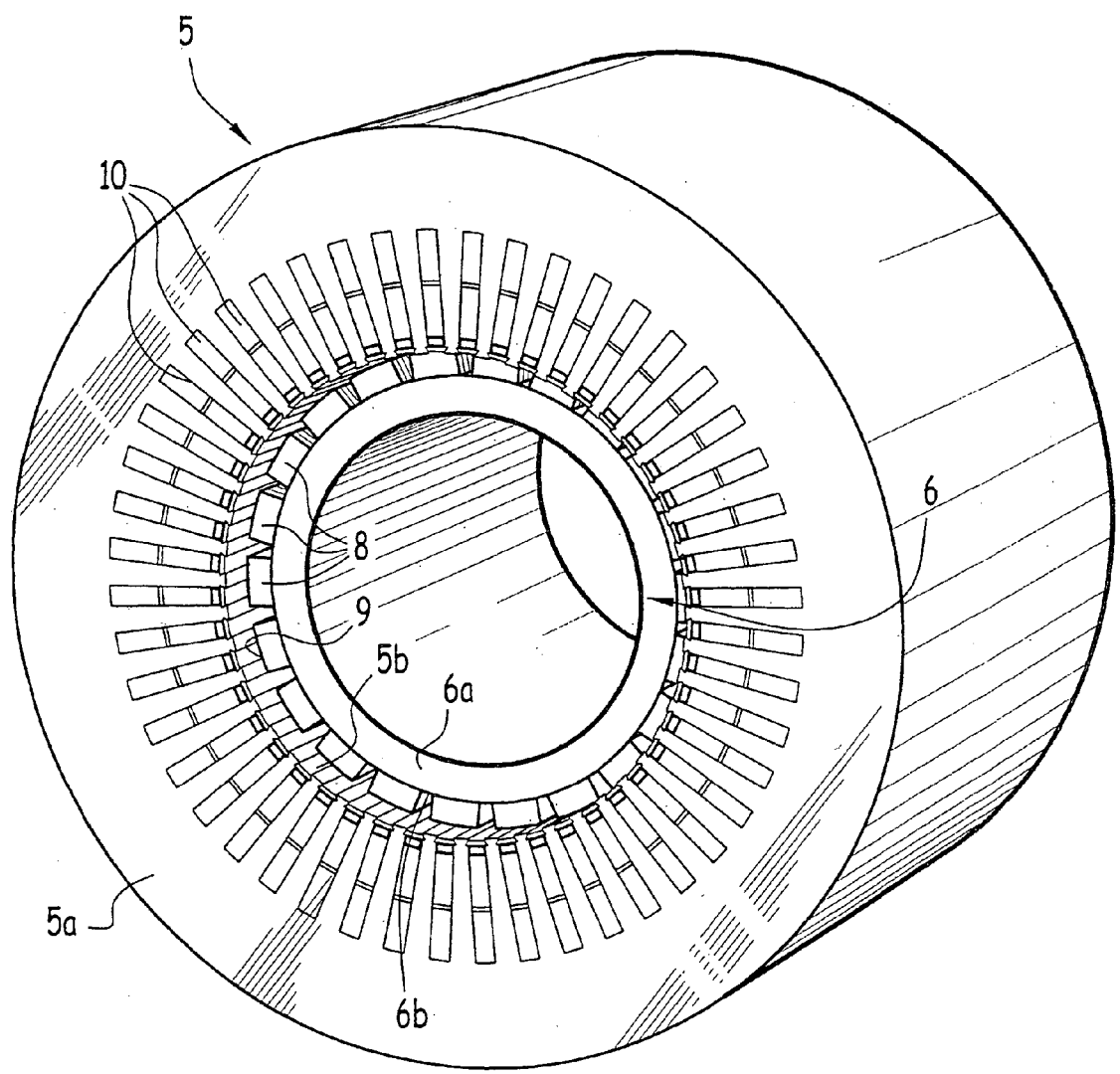
FIG. 3 is a diagrammatic perspective view of a portion of an electrical machine comprising a device for internal cooling according to the invention.

As can be seen in FIG. 3, the magnetic circuit 5a of the stator has a tubular shape and the successive recesses 10 in which the windings 7 are placed are provided inside the magnetic circuit in radial directions, each of the recesses extending between an inlet face 5b at the internal periphery of the stator 5, at which face the successive recesses 10 open out, and an internal portion of the magnetic circuit 5a of the stator. The rotor has been represented in FIG. 3 in the form of an annular member constituting the rim 6a of the rotor whose external peripheral surface 6b constitutes the active face of the rotor 6, on which face the permanent magnets 8 are mounted. The inlet face 5b at the internal periphery of the stator is placed facing the active face 6b of the rotor carrying the permanent magnets, a free space or air gap 9 being provided between the inlet face 5b and the active face 6b.

Each of the recesses 10 extends from an inlet portion at the location of the air gap 9 as far as a base portion inside the magnetic circuit 5a of the stator.

The device for cooling the electrical machine comprises a device 11 for external peripheral cooling, tubes 14 for internal cooling, a first and a second manifold 13a, 13b for the supply and recovery of cooling fluid, and an external circuit for supplying the manifolds which comprises, in particular, a circulation pump 15 and a cooling heat exchanger 16 (shown in FIG. 1).

A cooling fluid (for example water) circulates in a closed circuit in the space for external peripheral cooling and in tubes for internal cooling which, at their longitudinal ends, are connected to the manifolds 13a and 13b.

The device 11 for external peripheral cooling comprises an annular cavity 17 surrounding the frame 5c of the stator constituting its external peripheral portion. The cavity 17 may be delimited by pieces of sheet-metal 19 which constitute sheathing around the frame 5c and which are joined to one another and to the frame 5c by welds. The frame 5c may also be machined to delimit a cavity which is closed by a peripheral piece of sheet-metal.

A cooling tube 14 is located inside each of the stator recesses 10 in accordance with the axial longitudinal direction of the electrical machine, each of the cooling tubes 14 being connected at its ends to the manifolds 13a and 13b.

The device 11 for external peripheral cooling and the tubes 14 for internal cooling may be connected to the same manifolds for the supply and recovery of cooling fluid or to different manifolds.

Figure 4:
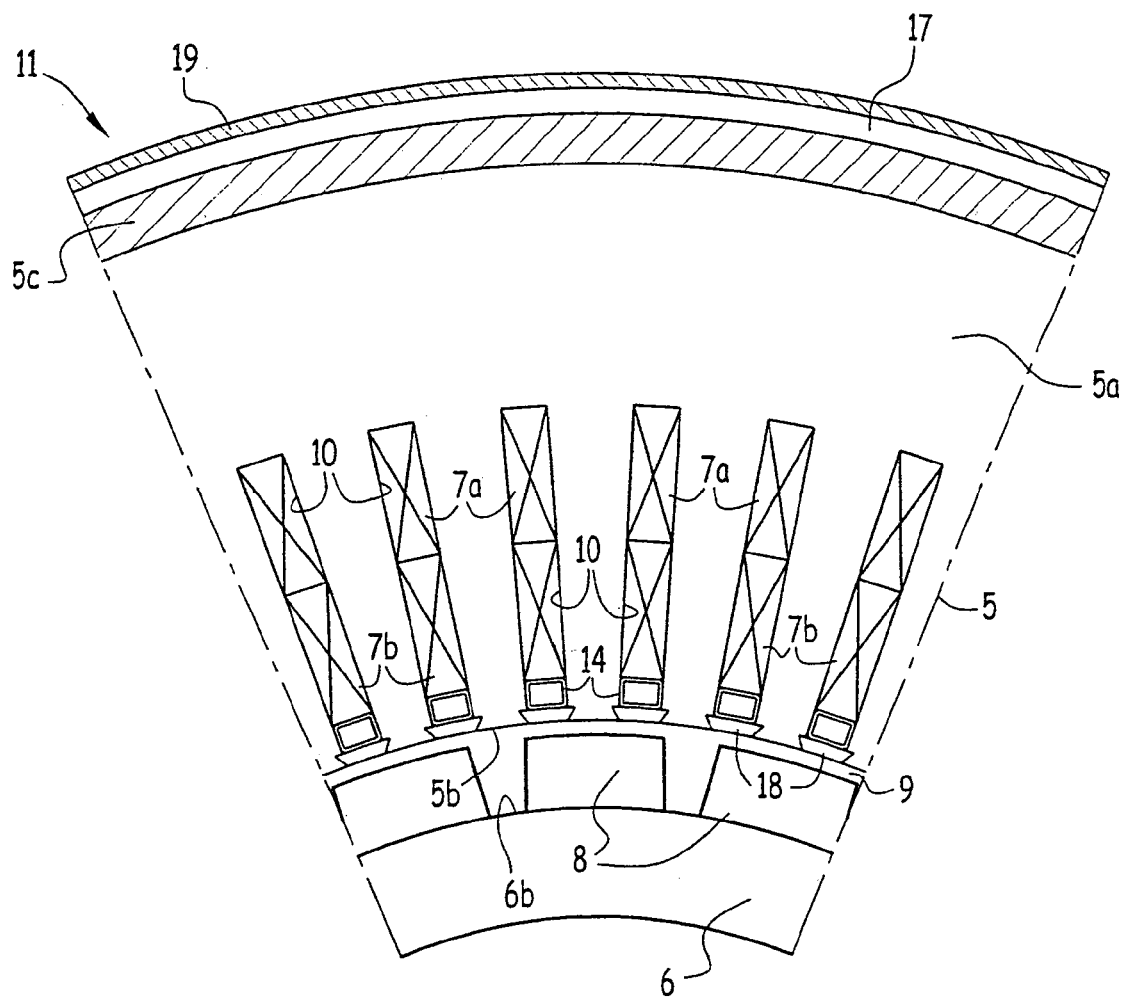
FIG. 4 is a partial sectional view of an internal portion of the stator of the electrical radial flux machine represented in FIG. 3.

According to the invention, as is shown especially in FIG. 4, the tubes 14 for the internal cooling of the stator are each located in an inlet portion of a recess 10, that is to say, the end portion of the recess located in the vicinity of the air gap 9 provided between the inlet face 5b of the stator at its internal peripheral portion and the permanent magnets 8 carried by the active face 6b of the rotor 6. Each of the recesses 10 contains at least one winding 7a which is located towards the base of the recess and at least one winding 7b which is located towards the air gap 9 and in contact with which the cooling tube 14 is placed. Therefore, the cooling tube is in contact with the winding plane next to the air gap, where the loss density and therefore the heating are at their highest.

The cooling tube 14, whose cross-section may be rectangular, has a width adapted to the width of the recess 10 so that the tube is held in an excellent manner inside the recess and in thermal contact with the magnetic circuit of the stator and the winding located nearest to the recess inlet. The cooling tube 14 in contact with the external surface of the winding located towards the air gap cools the winding by conduction and convection inside the cooling fluid. Each of the cooling tubes 14 is secured in the inlet portion of a recess 10 by a wedge 18 which may be engaged in grooves machined in the internal peripheral portion of the magnetic circuit of the stator, in order to provide a fastening for the cooling tubes 14, for example of the dovetail type. Each of the tubes 14 is thus interposed and clamped between the external portion of the winding, which portion is located in the recess, and the wedge engaged in the inlet portion of the recess.

The wedges 18 can be readily removed and put back in place, so that the dismounting of the cooling tubes 14 is an operation which can be carried out without difficulty. It is therefore easy to replace a cooling tube, for example when the tube has a leak.

Such an operation is not possible in the case of cooling tubes according to the prior art which are located in the bases of the recesses, the windings being secured permanently inside the recesses.

Preferably, the cooling tubes 14 (and optionally the wedges 18) are composed of a material having very low electrical conductivity and good thermal conductivity. Such materials may be, for example, metal alloys of suitable composition, such as stainless steels or copper-nickel-zinc alloy, polymers containing a filler or composite materials. Cooling tubes composed of a material marketed by Cool Polymers Inc., such as a polymer having a liquid crystal structure (LCP), a polyphenylene sulphide (PPS) or Nylon 6, may advantageously be used. Such materials have a thermal conductivity higher than that of epoxy resin and an electrical conductivity lower than that of copper.

The cooling device according to the invention comprising cooling tubes in the inlet portions of the stator recesses permits much more efficient protection of the permanent magnets 8 carried by the rotor rim than do the devices according to the prior art. Therefore, it is possible to design more compact machines whose magnets maintained at temperature exhibit enhanced performance.

It is possible to combine the internal cooling of the stator by cooling tubes at the inlet of the recesses with external cooling by any device located in the magnetic circuit of the stator or at the periphery of that magnetic circuit.

Figure 2:
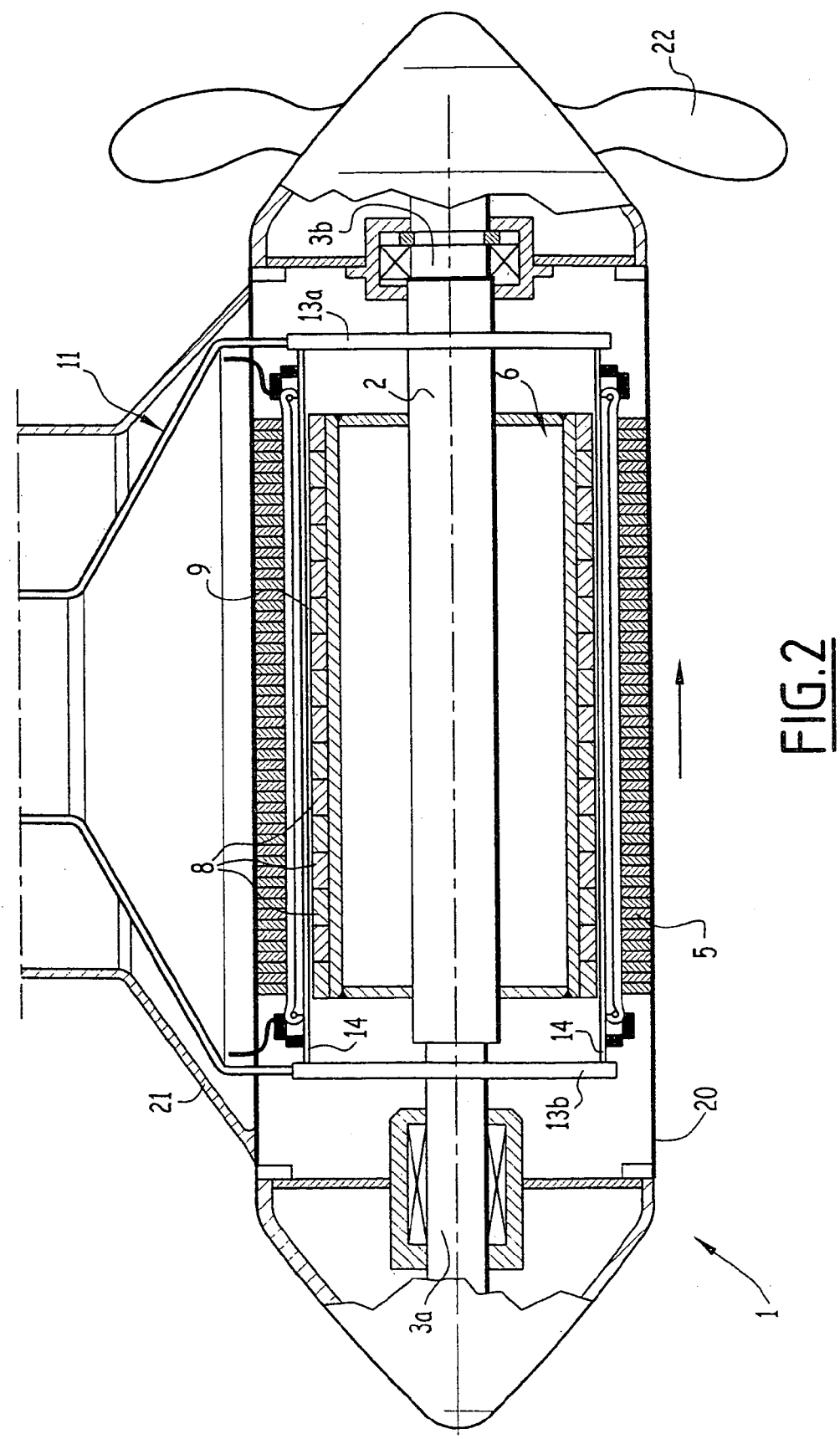
FIG. 2 is a view in partial longitudinal section of an electrical machine according to the invention and according to a second embodiment in which the electrical machine is immersed in a fluid.

FIG. 2 shows an electrical machine comprising a cooling device according to the invention and according to a variant.

The corresponding elements in FIGS. 1 and 2 have the same reference signs.

The electrical machine represented in FIG. 2, which may be used to propel a boat, is located inside a pod 20 which is suspended beneath the hull of the boat by way of a strut 21 and on which is rotatably mounted a screw propeller 22 for propelling the boat.

The electrical machine 1 mounted inside the pod 20 comprises a stator 5 which is secured in the pod body and a shaft 2 which is fixedly joined to the rotor 6 and which has a longitudinal direction and is mounted inside end portions of the pod by way of bearings 3a and 3b. The rotor 6 fastened to the shaft 2 is mounted inside the stator. The rotor 6 comprises an active external surface which faces an internal peripheral inlet surface of the stator and carries permanent magnets 8. An air gap 9 is provided between the active face of the rotor carrying the permanent magnets 8 and the internal inlet face of the stator 5.

The stator 5 of the motor is formed as described above and comprises successive recesses in the circumferential direction of the stator which open out on the internal peripheral face, or inlet face, of the stator, at the location of the air gap 9. Each of the recesses having a radial direction comprises an inlet portion on the side where the air gap 9 is located and a base inside the yoke and the stator.

The device for cooling the electrical machine, which device is generally indicated by the reference sign 11, comprises solely a circuit for internal cooling comprising tubes 14 placed in each of the stator recesses.

The external cooling of the stator is ensured by the water in which the boat is moving, through the wall of the pod 20.

The circuit for the internal cooling of the stator comprises, as before, cooling tubes 14 which are each located in an inlet portion of a recess containing stator windings.

Cooling fluid is set in circulation in the circuit for the internal cooling of the stator, and in particular in the tubes 14, by means of supply and recovery manifolds 13a and 13b which are connected to a cooling circuit comprising, in particular, a motor-driven pump and a heat exchanger, both of which may be located inside the strut 21 from which the pod 20 of the boat is suspended.

The functioning and the advantages of the cooling device according to the variant represented in FIG. 2 are similar to those which have been described above with regard to the first embodiment shown in FIG. 1.

Figure 5:
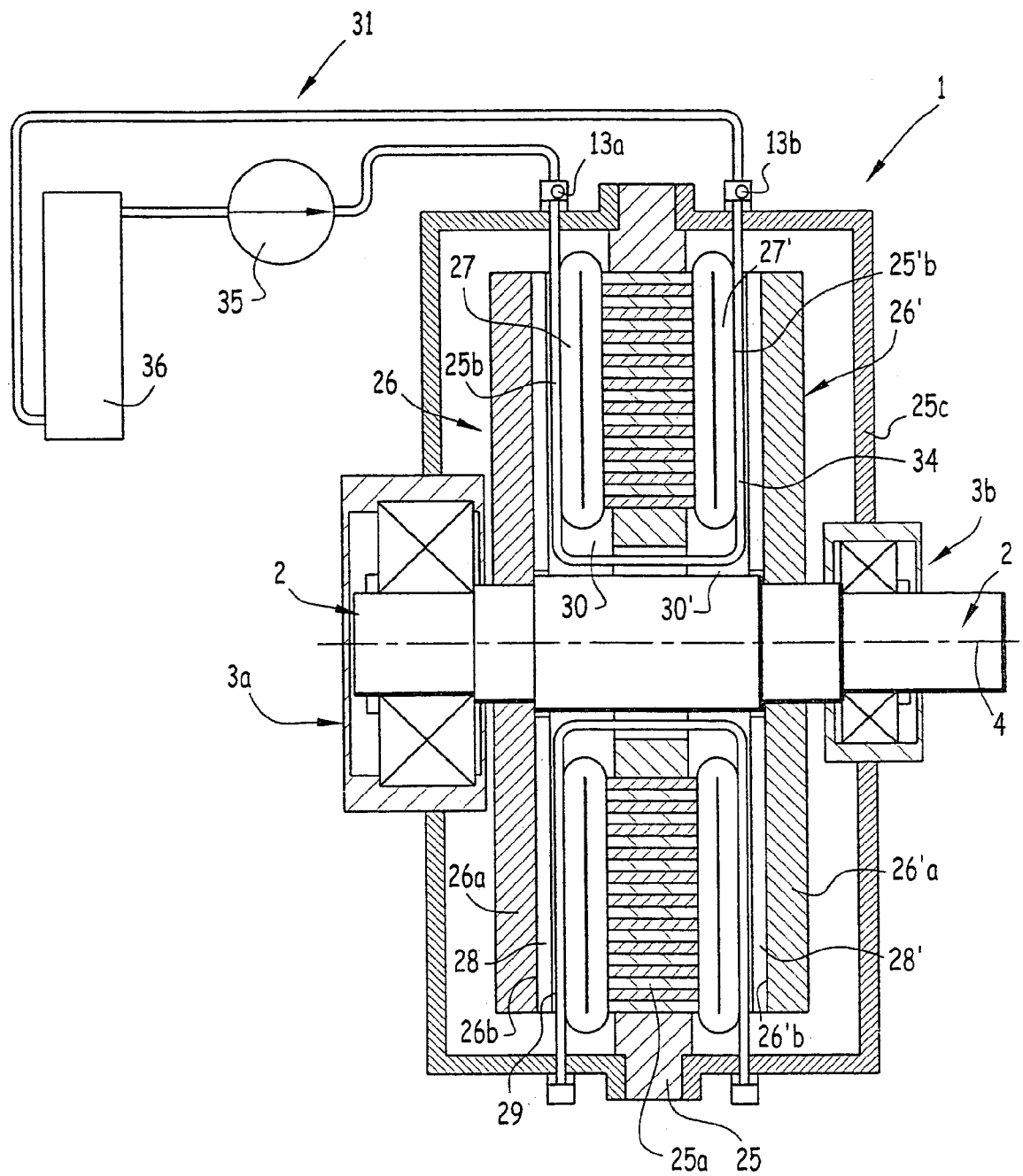
FIG. 5 is a view in axial section of an axial flux machine comprising a cooling device according to the invention.

FIG. 5 shows an electrical axial flux machine. The electrical machine as a whole, the shaft of the machine, the shaft bearings and the axis of rotation will be marked by the reference signs 1, 2, 3a, 3b and 4, respectively, as in the case of the radial flux machines described above.

The electrical machine 1 comprises a double stator 25 and a double rotor 26, 26' in the form of discs. The stator 25 is secured inside a frame 25c of sheet-metal forming a casing which surrounds the electrical machine. The stator 25 comprises a magnetic circuit 25a in the form of a disc secured at its periphery in the frame 25c and having a central portion in the form of an annular disc constituting a magnetic circuit which is generally produced by rolling up pieces of magnetic sheet-metal. The stator disc has on its two opposite faces, recesses 30, 30' which each extend inside the magnetic circuit of the stator in a longitudinal direction which is radial relative to the stator, that is to say, perpendicular to the machine axis 4 common to the stator 25 and the rotor 26, 26', and in a direction parallel with the machine axis 4, between an inlet face 25b or 25'b of the stator and a recess base inside the magnetic frame. The recesses 30, 30' of the stator are located in succession in the circumferential direction of the stator, about the axis 4. At least one winding 27, 27' is placed in each of the recesses 30, 30' and extends in accordance with the longitudinal direction of that recess. The windings 27, 27' are connected to means for the supply or recovery of electrical current.

The rotor comprises two rotor elements 26 and 26' which are constituted by steel rims in the form of discs. The steel rims 26a and 26'a of the rotor each comprise an active face 26b, 26'b on which are secured rows of permanent magnets 28, 28' which are aligned in accordance with radial directions of the annular yokes 26b and 26'b in order to constitute separate successive rows, in the circumferential direction of the rotor discs, about the axis 4 on which the rotor discs are secured. The rows of magnets having a radial direction are located facing the stator windings 27, a free space or air gap 29 having a thickness of a few millimeters in the radial direction being provided between the rotor magnets and the stator windings.

The stator in the form of an annular disc is traversed, in accordance with its axis 4, by the shaft 2 extending through a central opening in the stator. The rotor discs are secured to the shaft in such a manner that the stator, the shaft 2 and the rotor have the same axis 4.

The device for cooling the electrical machine is formed in accordance with the invention and comprises, in particular, a cooling tube 34 placed in the longitudinal direction of each of the stator recesses 30, in the inlet portion of the recess, that is to say, in the portion of the recess 30 adjacent to the air gap 29. The tubes 34, which are produced in the same manner as the tubes 14 of the radial flux machines described above, are connected to manifolds 13a, 13b for the distribution and recovery of cooling fluid, which are themselves connected to a cooling circuit 31 comprising a circulation pump 35 and a cooling heat exchanger 36.

The external cooling of the stator is effected by circulating a fluid in contact with the stator or the frame 25c of the stator.

The production and advantages of the cooling device and, in particular, the device for internal cooling according to the invention are the same as in the case of the radial flux machines described above.

The principal advantages of the device according to the invention are the following:

in the case of electrical machines having windings produced in several superposed planes, the loss density is generally higher at the location of the winding plane situated on the side where the air gap is arranged, that is to say, in the inlet portion of the recesses, and a cooling tube located in that recess portion permits improved cooling of the winding plane that is subjected to the greatest heating, in the case of synchronous machines having permanent magnets, the magnets located on the rotor are particularly vulnerable to temperature. Excessive heating of the magnets results in a reduction in their residual induction and the machine's performance may be adversely affected thereby. The tubes located at the recess inlets make available a cold source between the stator, in which the majority of the electrical losses and heating occur, and the permanent magnets. By limiting the propagation of heat between the stator and the rotor, the performance of the magnets is improved and it is possible to design more compact electrical machines.

If materials having low electrical conductivity and good thermal conductivity are used to produce the tubes and optionally the wedges for securing the cooling tubes at the recess inlets, the losses in the stator that are caused by the variations in the magnetic field in the vicinity of the stator inlet face adjacent to the air gap are limited.

The invention is not limited strictly to the embodiments which have been described.

It is thus possible to envisage cooling devices comprising an external circuit for cooling the stator which may be in any form, or devices without a circuit for the external cooling of the stator.

It is possible to use a circuit for internal cooling comprising cooling tubes only in the inlet portions of the recesses or else cooling tubes in the inlet portions and in the bases of the recesses.

The invention is applicable to any electrical radial flux or axial flux machine whose stator comprises recesses containing windings opening out at the location of the air gap of the electrical machine.

The invention is applicable in particular to the naval electrical propulsion machines with which surface boats or submarines are equipped.

The invention claimed is:

1. An electrical machine comprising a stator including successive recesses provided in a circumferential direction of the stator about a stator axis, the recesses each containing at least one winding and opening out onto an inlet face of the stator, and a rotor mounted rotatably about the axis of the stator and having an active face including permanent magnets facing the inlet face of the stator and forming an air gap with the inlet face of the stator, each of the recesses of the stator extending in a longitudinal direction and from the inlet face of the stator, the inlet face being directed towards the air gap, in a direction perpendicular to the longitudinal direction and wherein each recess is formed with a preselected depth of the recess, the machine further including a cooling device comprising, in each of the stator recesses, at least one cooling tube extending in the longitudinal direction of the recess, and means for setting in circulation a cooling fluid inside each of the cooling tubes of the stator, the cooling tubes being in communication at their ends with manifolds for the supply and evacuation of cooling fluid, the tubes being connected to a cooling circuit comprising at least one pump and one heat exchanger, so that the cooling fluid circulates in a closed circuit, wherein for each of the recesses of the stator, at least one cooling tube is located in the inlet portion of the recess closest to the air gap.

2. An electrical machine according to claim 1, wherein the cooling fluid is a liquid.

3. An electrical machine according to claim 1 wherein the machine is of the radial flux type comprising an annular stator which surrounds a rotor and which comprises recesses whose longitudinal direction is parallel with an axis of the electrical machine, the axis being common to the rotor and the stator, wherein the machine comprises both a device for external cooling, having a cavity for the circulation of cooling fluid surrounding the external peripheral portion of the stator and tubes for internal cooling located in accordance with the longitudinal direction of the recesses in their inlet portion, the cavity of the device for external cooling being in communication with manifolds supplying and evacuating cooling fluid and connected to a cooling circuit comprising a pump and a heat exchanger.

4. An electrical machine according to claim 2 wherein the machine is of the radial flux type comprising an annular stator which surrounds a rotor and which comprises recesses whose longitudinal direction is parallel with an axis of the electrical machine, the axis being common to the rotor and the stator, wherein the machine comprises both a device for external cooling, having a cavity for the circulation of cooling fluid surrounding the external peripheral portion of the stator and tubes for internal cooling located in accordance with the longitudinal direction of the recesses in their inlet portion, the cavity of the device for external cooling being in communication with manifolds for supplying and evacuating cooling fluid and connected to a cooling circuit comprising a pump and a heat exchanger.

5. An electrical machine according to claim 1, and immersed in a fluid ensuring the external cooling of the stator of the electrical machine, wherein the machine comprises a circuit for the internal cooling of the stator, which circuit comprises, in the inlet portions of each of the stator recesses, a cooling tube in communication at its ends with the manifolds for supplying and evacuating cooling fluid and connected to a cooling circuit comprising at least one pump and one heat exchanger.

6. An electrical machine according to claim 2, and immersed in a fluid ensuring the external cooling of the stator of the electrical machine, wherein the machine comprises a circuit for the internal cooling of the stator, which circuit comprises, in the inlet portions of each of the stator recesses, a cooling tube in communication at its ends with the manifolds for supplying and evacuating cooling fluid and connected to a cooling circuit comprising at least one pump and one heat exchanger.

7. A machine according to claim 5 and used as a naval electrical propulsion machine secured in a pod suspended by a strut from the hull of a boat, wherein the means for the supply and evacuation of cooling fluid for the circuit for the internal cooling of the stator comprises a pump and a heat exchanger that are located in the suspension strut of the pod.

8. A machine according to claim 6 and used as a naval electrical propulsion machine secured in a pod suspended by a strut from the hull of a boat, wherein the means for the supply and evacuation of cooling fluid for the circuit for the internal cooling of the stator comprises a pump and a heat exchanger that are located in the suspension strut of the pod.

9. A machine according to claim 5, the machine being immersed in a liquid and comprising a stator in the form of an annular disc and a rotor comprising at least one magnetic circuit in the form of a disc, the stator comprising recesses having a longitudinal direction that is radial relative to the stator disc and perpendicular to the axis of the electrical machine, wherein the cooling tubes are located in accordance with the longitudinal direction of the recesses, in radial directions of the disc-form magnetic circuit of the stator.

10. A machine according to claim 6, the machine being immersed in a liquid and comprising a stator in the form of an annular disc and a rotor comprising at least one magnetic circuit in the form of a disc, the stator comprising recesses whose longitudinal direction is radial relative to the stator disc and perpendicular to the axis of the electrical machine, wherein the cooling tubes are located in accordance with the longitudinal direction of the recesses, in radial directions of the disc-form magnetic circuit of the stator.

11. A machine according to claim 1, wherein the cooling tubes are composed of a material having poor electrical conductivity lower than that of copper and having good thermal conductivity higher than that of epoxy resin.

12. A machine according to claim 11, wherein the cooling tubes are composed of one of the following materials: metal alloys, such as stainless steels and copper-nickel-zinc alloy, polymers of the type LCP, PPS or nylon, polymers containing a filler, composite materials.

* * * * *